United States Patent
Clayton, Jr.

(10) Patent No.: US 10,746,071 B2
(45) Date of Patent: Aug. 18, 2020

(54) ENGINE AFTERTREATMENT SYSTEM

(71) Applicant: Caterpillar Inc., Deerfield, IL (US)

(72) Inventor: Robert D. Clayton, Jr., Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 95 days.

(21) Appl. No.: 15/967,617

(22) Filed: May 1, 2018

(65) Prior Publication Data
US 2019/0338687 A1 Nov. 7, 2019

(51) Int. Cl.
| F01N 3/20 | (2006.01) |
| F01N 13/00 | (2010.01) |
| F02B 37/00 | (2006.01) |
| B01D 53/94 | (2006.01) |

(52) U.S. Cl.
CPC ......... *F01N 3/208* (2013.01); *B01D 53/9418* (2013.01); *B01D 53/9495* (2013.01); *F01N 13/0093* (2014.06); *F02B 37/00* (2013.01); *F01N 2610/02* (2013.01); *F01N 2900/08* (2013.01); *F01N 2900/1602* (2013.01)

(58) Field of Classification Search
CPC combination set(s) only.
See application file for complete search history.

(56) References Cited

U.S. PATENT DOCUMENTS

| 7,264,785 | B2 * | 9/2007 | Blakeman | B01D 53/9431 |
| | | | | 423/213.2 |
| 8,109,077 | B2 * | 2/2012 | Reba | F01N 3/0253 |
| | | | | 60/274 |
| 8,132,404 | B2 * | 3/2012 | Oberski | F01N 3/208 |
| | | | | 60/286 |
| 8,875,499 | B2 | 11/2014 | Kawada et al. | |
| 9,232,984 | B2 | 1/2016 | Chavannavar | |
| 9,353,665 | B2 | 5/2016 | Myer et al. | |
| 9,482,130 | B2 | 11/2016 | Lee et al. | |
| 9,512,764 | B2 | 12/2016 | Upadhyay et al. | |
| 9,644,515 | B2 | 5/2017 | Deshpande | |
| 10,364,724 | B2 * | 7/2019 | Nilsson | F01N 3/208 |
| 2008/0223021 | A1 | 9/2008 | Shaikh et al. | |
| 2011/0099996 | A1 * | 5/2011 | Driscoll | F01N 3/208 |
| | | | | 60/598 |
| 2012/0036842 | A1 * | 2/2012 | Nakamura | F01N 3/2066 |
| | | | | 60/287 |
| 2015/0321145 | A1 | 11/2015 | Bartley | |

* cited by examiner

*Primary Examiner* — Binh Q Tran
(74) *Attorney, Agent, or Firm* — Bookoff McAndrews

(57) ABSTRACT

A method and system for treating engine exhaust gas of an engine system is disclosed. The method includes generating ammonia from a urea supply, supplying the ammonia to the engine exhaust gas upstream of a catalyst device, and supplying urea to the engine exhaust gas downstream of the supplying of the ammonia, and downstream of the catalyst device.

20 Claims, 5 Drawing Sheets

ENGINE AFTERTREATMENT SYSTEM

TECHNICAL FIELD

The present disclosure relates generally to an engine aftertreatment system, and more particularly, to an engine aftertreatment system having an ammonia generating system.

BACKGROUND

Internal combustion engines, including diesel engines, gasoline engines, gaseous fuel-powered engines, and other engines known in the art, may produce a flow of exhaust composed of gaseous and solid compounds, including particulate matter, nitrogen oxides (NOx), and sulfur compounds. Due to heightened environmental concerns, exhaust emission standards have become increasingly stringent. The amount of one or more constituents of the flow of exhaust emitted from the engine may be regulated depending on the type, size, and/or class of engine.

One method that has been implemented by engine manufacturers to comply with the regulation of NOx exhausted to the environment is a strategy called selective catalytic reduction (SCR). SCR is a process by which gaseous or liquid reductant (e.g., a mixture of urea and water) is injected into the flow of exhaust from the engine. The combined flow may form ammonia ($NH_3$), which may then be absorbed onto an SCR catalyst. The ammonia on the catalyst may react with NOx in the flow of exhaust gas to form $H_2O$ and $N_2$, thereby reducing the amount of NOx in the flow of exhaust gas.

The ability of the SCR catalyst to reduce NOx depends upon many factors, such as catalyst formulation, the size of the SCR catalyst, exhaust gas temperature, exhaust gas flow rate, exhaust gas composition, and urea dosing rate. With regard to the exhaust gas temperature, NOx reduction from the mixture of urea and water may be delayed until the exhaust gas temperature is sufficiently high to avoid urea crystallization and deposit formation. Thus, during cold start and low load conditions, NOx reduction may be limited.

U.S. Pat. No. 9,353,665, issued to Meyer et al. on May 13, 2016 ("the '665 patent"), describes an engine system having an ammonia generating system for an SCR system. For example, FIG. 2 of the '665 patent discloses an ammonia generation system 216, and a reductant dosing module 112 for supplying reductant to a decomposition chamber 104. The ammonia generating system of Mayer uses sonic cavitation or lasers to decompose reductant to ammonia. Such an ammonia generating system may be complex and fail to fully utilize aspects of the engine system to reduce NOx in the engine exhaust gas.

The engine aftertreatment system of the present disclosure may solve one or more of the problems set forth above and/or other problems in the art. The scope of the current disclosure, however, is defined by the attached claims, and not by the ability to solve any specific problem.

SUMMARY

According to one aspect of the disclosure, a method for treating engine exhaust gas of an engine system includes generating ammonia from a urea supply, supplying the ammonia to the engine exhaust gas upstream of a catalyst device, and supplying urea to the engine exhaust gas downstream of the supplying of the ammonia, and downstream of the catalyst device.

According to another aspect of the present disclosure, a method for treating engine exhaust gas of an engine system includes generating ammonia from a urea supply, supplying the ammonia to the engine exhaust gas during a cold start condition of the engine system, and at a location upstream or directly downstream of a turbine of a turbocharger of the engine system, discontinuing the supply of ammonia at a predetermined temperature, and supplying urea to the engine exhaust gas.

According to yet another aspect of the present disclosure an engine system includes an engine intake system, an engine, and an engine exhaust system. The engine system further includes a system for generating ammonia from a urea supply, an ammonia line coupled to the engine exhaust system, a urea line coupled to the engine exhaust system downstream of the ammonia line, and a catalyst located in the engine exhaust system upstream of the urea line.

DETAILED DESCRIPTION

Both the foregoing general description and the following detailed description are exemplary and explanatory only and are not restrictive of the features, as claimed. The various features described below can each be used independently of one another or in combination with other features. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," and "approximately" are used to indicate a possible variation of ±10% in a stated value.

Figure 1:
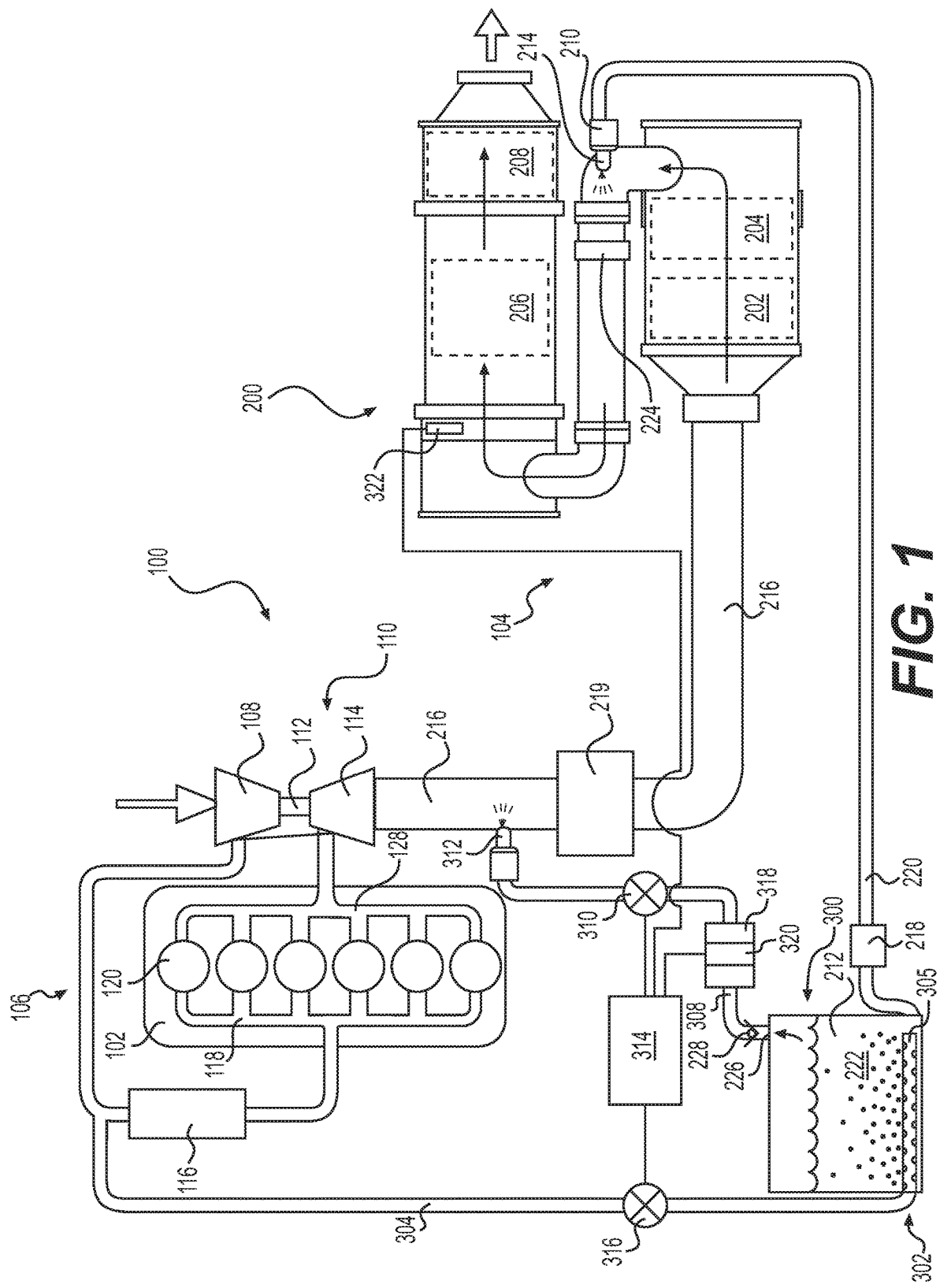
FIG. 1 illustrates an engine system with an ammonia generating system according to the present disclosure.

FIG. 1 illustrates an engine system 100 having an air intake system 106, engine 102, and an exhaust system 104. The engine 102 may be an internal combustion engine such as a diesel piston engine, a gasoline piston engine, a rotary engine, a turbine engine, or any other engine which may emit exhaust gases that flow through an aftertreatment system or other components, and are emitted into the environment. The engine 102 illustrated is a six (6) cylinder engine, but an engine with more or less cylinders is contemplated. The air intake system 106 may provide intake air for the combustion process of the engine 102. The air intake system 106 may include a compressor 108 which may compress the intake air before it enters combustion chambers 120 of the engine 102. The compressor 108 may be part of a turbocharger 110, and be driven through a driving connection 112 by a turbine 114. In alternative aspects, the system 100 may have a different type compressor 108 such as a supercharger (not shown), multiple turbochargers, or no turbocharger at all.

The compressor 108 may be fluidly connected to an intake air cooler such as an air to air aftercooler (ATAAC) 116. The air cooler may cool the compressed air before the compressed air enters the combustion chambers 120 through an intake manifold 118. In the combustion chambers 120 the compressed air may be mixed with fuel and ignited through compression and/or spark ignition. Exhaust gases from the combustion may flow from the combustion chambers 120 into an exhaust manifold 128. Exhaust gases may flow from the exhaust manifold 128 to the exhaust system 104 and/or through an exhaust gas recirculation (EGR) system (not shown). The exhaust system 104 may define an exhaust gas flow path from the engine 102 to the outside environment.

The exhaust system 104 may include an exhaust line 216 and an aftertreatment system 200. Aftertreatment system 200 may include aftertreatment components, for example, a diesel oxidation catalyst (DOC) 202, a diesel particulate filter (DPF) 204, a selective catalytic reduction catalyst (SCR catalyst) 206, an ammonia oxidation catalyst (AMOX) 208, as is known in the art. Other aftertreatment components, such as, but not limited to, a lean NOx trap (not shown), a lean NOx catalyst (not shown), a NOx adsorber (not shown), and/or other aftertreatment components as known in the art may also or alternatively be included in the aftertreatment system 200.

Aftertreatment system 200 may also include a reductant injector 210 connected to a reductant supply 222 to inject reductant into the engine exhaust line 216. The reductant supply will be referred to herein as "urea" contained in a urea tank 212. It is understood that urea tank 212 may include urea only, a urea and water mixture, and/or other elements or compounds capable of chemically reducing compounds, e.g., NOx, contained within the flow of exhaust gas in the presence of, for example, selective catalytic reduction catalyst (SCR) 206. The injector 210 (hereinafter "urea injector 210") may include a nozzle 214 or other flow control device configured to assist in controllably releasing a flow of the urea into the flow of exhaust gas from the engine 102. The urea injector 210 may receive urea 222 from urea tank 212 via a pump arrangement 218 and urea line 220. The urea injector 210 may be any type of injector known in the art and may include any device capable of injecting and/or atomizing an injected urea. Urea injector 210 may be located downstream of the diesel oxidation catalyst (DOC) 202, and upstream of the diesel particulate filter (DPF) 204, a selective catalytic reduction catalyst (SCR) 206, and the ammonia oxidation catalyst (AMOX) 208. Further, aftertreatment system may also include one or more mixing structures 224 immediately downstream of the urea injector 210.

The engine system 100 may further include an ammonia generating system 300 configured to supply ammonia into the exhaust line 216 of engine system 100. In one aspect of this disclosure, the ammonia generating system may include urea tank 212 and a heating assembly 302 located within or about urea tank 212. For example, heating assembly 302 may include a heating line 304 supplying engine intake air to the urea tank 212. The heating line 304 may include an upstream end coupled downstream of one or more turbocharger compressors 108 of the engine intake system 106, but upstream of the aftercooler 116. In an alternative aspect, the upstream end of heating line 304 may be located downstream of the aftercooler 116, but upstream the intake manifold 118 of engine 102. A downstream end of heating line 304 may be coupled to a bottom portion of urea tank 212 to supply the compressed/heated engine intake air directly into the urea 222 of the urea tank 212 to heat the urea 222. The downstream end of the heating line 304 may include a sparger 305 extending along the bottom of the urea tank 212. The sparger 305 may be configured to provide small bubble sizes (with corresponding increase surface area) to increase the transfer of heat between the urea liquid and the intake air/gas supplied to the urea tank 212. The heating assembly 302 may further include an opening 226 at a top portion of the urea tank 212 to receive ammonia gases (and engine intake air) resulting from the heating and pressurizing of the urea 222 by the engine intake air from heating line 304.

An ammonia line 308 may be coupled to the heating assembly 302 at opening 222 of urea tank 212 to supply the ammonia into the engine exhaust line 216 of engine system 100. The downstream or outlet end 312 of ammonia line 308 may feed ammonia into exhaust line 216 at a location downstream of the turbine 114 of turbocharger 110, but upstream of the urea injector 210. For example, the downstream or outlet end 312 of ammonia line 308 may be directly downstream of the turbine 114. As described herein, directly downstream means downstream without any other components in the exhaust line 216 therebetween. While FIG. 1 depicts outlet end 312 of ammonia line as including an ammonia injector, it is understood that any type of outlet may be used to connect ammonia line 308 to the engine exhaust line 216. The ammonia line 308 may include a check valve 228 located, for example, adjacent the opening 226 to prohibit reverse flow of engine exhaust gas into urea tank 212. Further, a control valve 310 may be included in ammonia line 308 to further assist in controlling the flow of ammonia through ammonia line 308. The control valve 310 may be, for example, an electronic valve receiving control signals from a controller 314. Controller 314 may also be connected to a control valve 316 in heating line 304 to control the flow of compressed/heated intake air to urea tank 212. While the control valves 310 and 316 are shown as electronically controlled valves, it is understood that the control valves could be any type of control valves, such as pneumatically or hydraulically actuated valves.

Ammonia line 308 may optionally include an ammonia absorber 318 configured to store ammonia produced by heating assembly 302 of ammonia generating system 300. The ammonia absorber 318 could include a heating system, such as a resistance heater 320 controlled by controller 314, to selectively release stored ammonia on the ammonia absorber 318 to the exhaust line 216.

Figure 5:
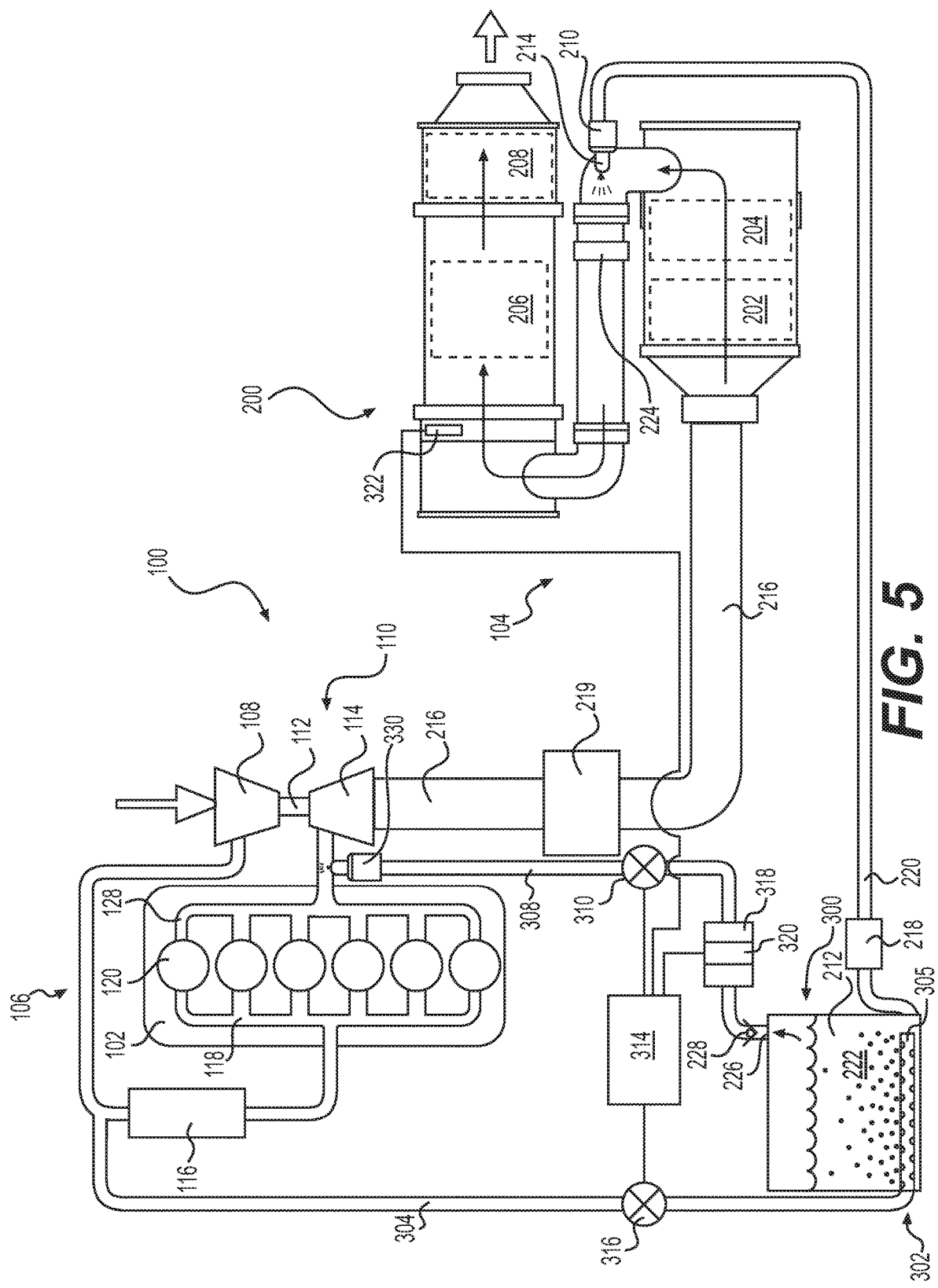
FIG. 5 illustrates an engine system with ammonia generating system according to yet another alternative aspect of the present disclosure.

While FIG. 1 depicts ammonia line 308 as having a downstream or outlet end 312 located downstream of the turbine 114 of turbocharger 110 (and upstream of urea injector 210), the downstream end of ammonia line 308 may be located elsewhere in engine system 100. For example, as shown in FIG. 5, ammonia line 308 may include a downstream end 330 located in the engine exhaust line 216 immediately downstream the exhaust manifold 128 and upstream of the turbine 114 of turbocharger 110. In such an arrangement, the turbine 114 may assist in mixing the ammonia in the engine exhaust line 216. Even further, an SCR catalyst (not shown) could be included between the downstream end 330 of ammonia line 308, and the turbine 114. This configuration would take advantage of the higher exhaust gas temperatures upstream of the turbine 114 to assist in NOx reduction during cold start or low load conditions such as idle. In these configurations and the other configurations of ammonia line 308 described in this disclosure, ammonia generation system 300 and/or ammonia line 308 may include appropriate features to ensure proper flow into the engine exhaust line 216. For example, urea tank 212 or ammonia line 308 may include additional valving and/or a compressor (not shown) to provide sufficient pressure to deliver the ammonia through ammonia line 308 and into the exhaust line 216.

Referring back to FIG. 1, engine exhaust line 216 may include an SCR catalyst 219. SCR catalyst 219 may be located in exhaust line 216 downstream of the downstream end (312, 330) of ammonia line 308 and upstream of urea injector 210. The SCR catalyst may be a low temperature conversion (light-off) catalyst to convert NOx to N2 during cold start or idle. It is understood that SCR catalyst 219 may be omitted, and in such a configuration, the downstream SCR catalyst 206 would be positioned upstream of the DOC 202 and DPF 204.

Variations in the heating assembly 302 are also contemplated. For example, instead of using heating line 304 to supply engine intake air to the urea tank 212 as a heating medium or source, a resistance heater (not shown) could be included in urea tank 212 to heat the urea to form ammonia. Such a resistance heater could be controlled, for example, by controller 314. Alternatively, the heating assembly 302 could incorporate the aftercooler 116 of the engine intake system 106 in a configuration where urea could be used as the cooling medium through the aftercooler 116, and thus receive the heat from the compressed engine intake air. Even further, heating assembly 302 could alternatively include an engine coolant line extending into urea tank 212, similar to conventional systems used to thaw urea in cold environments. In these alternative configurations for the heating assembly 302 a compressor (not shown) and associated valve control (e.g. control valve 310) could be included, to help convey or meter the flow of ammonia through ammonia line 308 and/or exhaust line 216.

Figure 4:
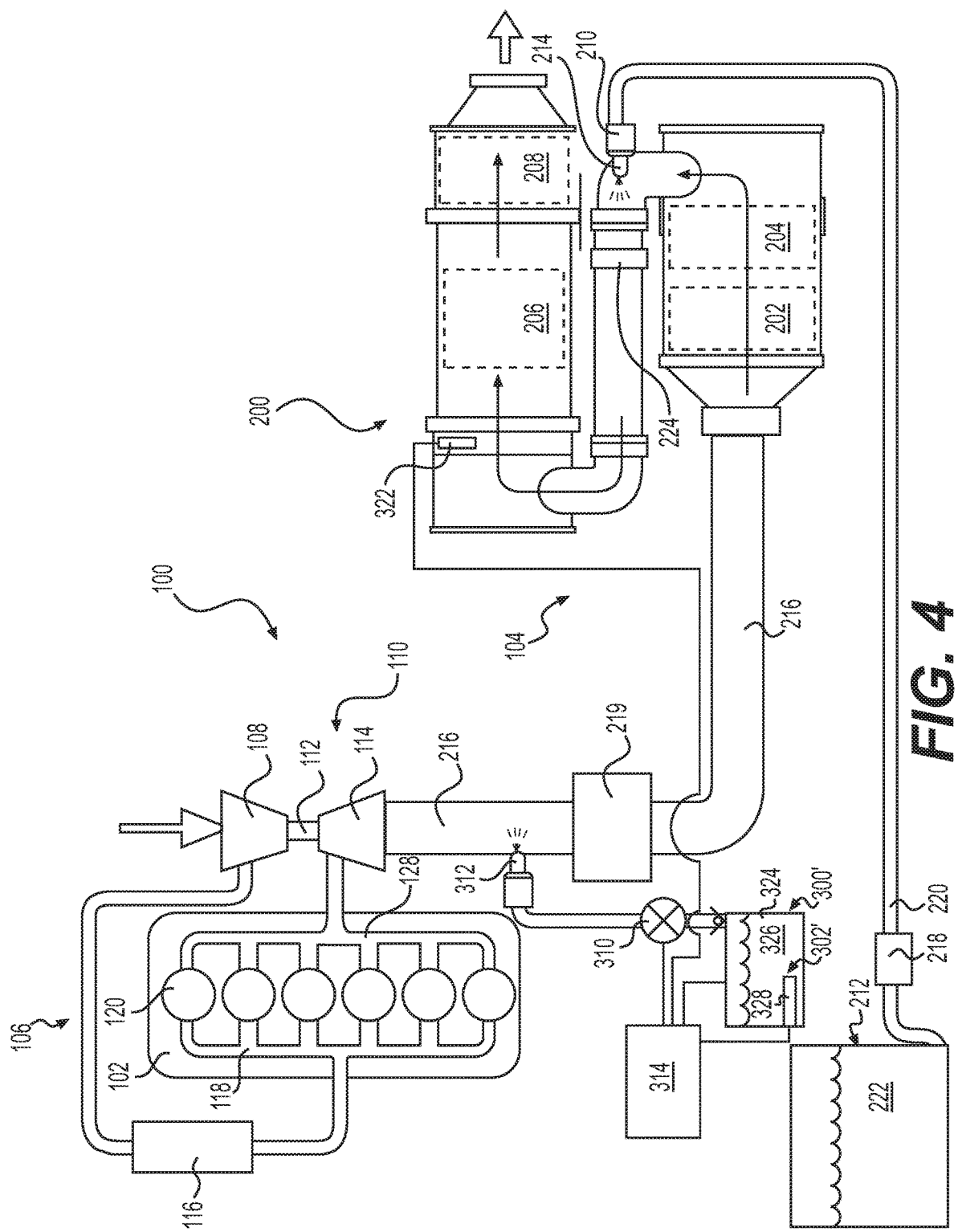
FIG. 4 illustrates an engine system with an ammonia generating system according to an alternative aspect of the present disclosure.

Even further, while the heating system 302 (FIG. 1) and the variations discussed above are described as associated with urea tank 212, it is understood that the heating assembly 302 could be separate from the urea tank 212. For example, as shown in FIG. 4, an ammonia generating system 300' may include a separate urea tank 324 with its own supply of urea 326 and a heating assembly 302'. Urea tank 212 may be fluidly and controllably coupled to share urea with separate urea tank 324. The heating assembly 302' could include heating line 304 discussed above, or a resistance heater 328 as shown in FIG. 4 and discussed above in connection with urea tank 212. The heating assembly 302' alternatively could include the aftercooler 116 or the engine coolant line, again as discussed above with respect the heating assembly 302 of urea tank 212.

Controller 314 may include any appropriate hardware, software, firmware, etc. to carry out the methods described in this disclosure. For, example, controller 314 may include one or more processors, memory, communication systems, and/or other appropriate hardware. The processors may be, for example, a single or multi-core processor, a digital signal processor, microcontroller, a general purpose central processing unit (CPU), and/or other conventional processor or processing/controlling circuit or controller. The memory may include, for example, read-only memory (ROM), random access memory (RAM), flash or other removable memory, or any other appropriate and conventional memory. The communication systems used in the components of the system 100 may include, for example, any conventional wired and/or wireless communication systems such as Ethernet, Bluetooth, and/or wireless local area network (WLAN) type systems. Further, the communication systems may include any appropriate and conventional user interface, such as keyboards, keypads, touchscreen interfaces, etc. Additionally, controller 314 may be configured to send and receive data or signals from various sensors, and other hardware associated with engine system 100. For example, controller 314 may be coupled to control valves 310, 316 as discussed above, and be connected to a temperature sensor 322 and NOx sensor (not shown) located in engine exhaust line 216.

INDUSTRIAL APPLICABILITY

The disclosed engine aftertreatment system may be used in engine systems to help reduce harmful emissions, such as NOx. Such engine systems may include, for example, industrial engine systems used in stationary or mobile systems.

Figure 2:
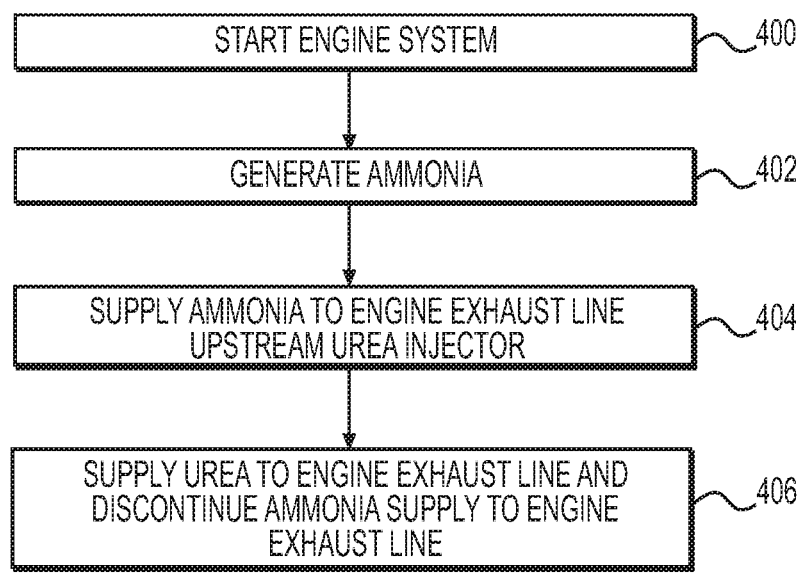
FIG. 2 is a method of operating the engine system of FIG. 1.

Referring to FIGS. 1 and 2, operation of the disclosed system includes starting of the engine system 100 (Step 400). After the engine system 100 is started, generation of ammonia is initiated with ammonia generating system 300, 300' (Step 402). As explained above, ammonia generating system 300, 300' may include a heating system 302, 302' for heating urea to form ammonia. For example, as shown in FIG. 1, heating system 302 may include a urea tank 212 receiving heat via heating line 304 that supplies compressed/heated engine intake air to the bottom of urea tank 212. The engine intake air travels through the urea 222 in urea tank 212 and heats the urea 222 enough to form ammonia gas. Some of the ammonia gas collects at the top of urea tank 212 and is controllably supplied to the engine exhaust line 216 through ammonia line 308 (Step 404).

The supply of ammonia to the engine exhaust line 216 via ammonia line 308 may take place as soon as temperatures of the heating system 302 are sufficient to form ammonia from the urea 222 in urea tank 212. As shown in FIGS. 1 and 5, the ammonia may be supplied to the engine exhaust line 216 either downstream (FIG. 1) or upstream (FIG. 5) of the turbine 114 of turbocharger 110. The ammonia and exhaust gas then travels through SCR catalyst 219, which is upstream of urea injector 210. The supply of ammonia and SCR catalyst 219 provide for removal of NOx from the engine exhaust gas. Such NOx removal may be achieved at temperatures and loads lower than with urea injection.

The ammonia generation and/or supply may be discontinued once the temperature of the engine exhaust gas is high enough to support full dosing of urea through urea injector 210 (Step 406). This full-urea-dosing exhaust temperature may be approximately 250 degrees Celsius. For the purpose of this disclosure, unless indicated otherwise, engine exhaust temperatures referred to herein art taken at a location immediately upstream and adjacent SCR catalyst 206. Further for the purpose of this disclosure, an engine exhaust temperature below the full-urea-dosing temperature of 250 degrees Celsius (as measured at a location immediately upstream and adjacent the SCR catalyst 206) will be considered a "cold start" and "low load" condition of engine system 100. While the generation and/or supply of ammonia may discontinue at approximately 250 degrees Celsius, urea introduction through urea injector 210 may be supplied at lower temperatures, such as approximately 200 degrees Celsius, with the understanding that the supply urea may be less than a full dosing because the temperatures may not be sufficient to effectively control urea deposits at full dosing of injected urea.

Figure 3:
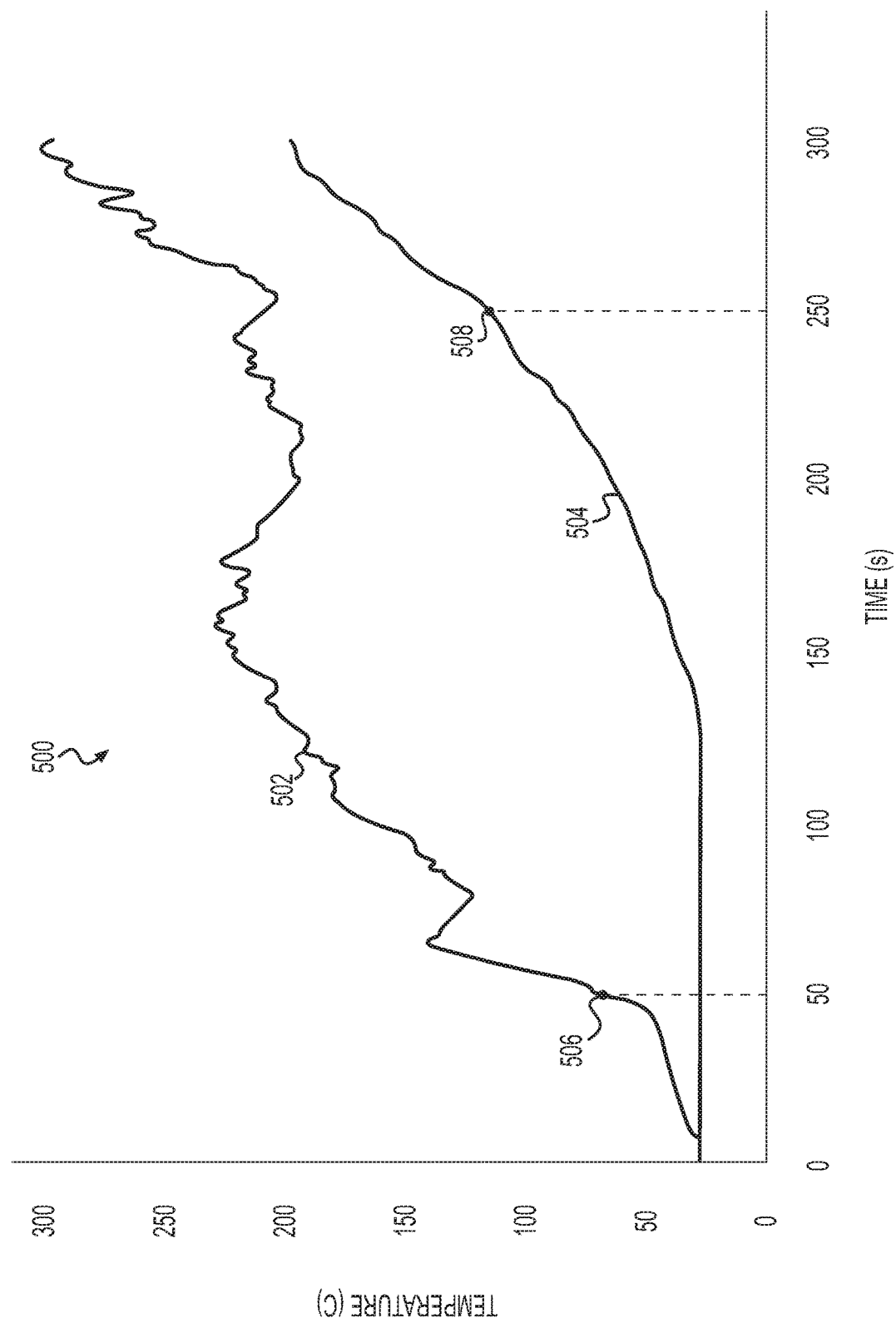
FIG. 3 is a graph of time vs. engine exhaust gas temperatures for the engine system of FIG. 1.

FIG. 3 shows a graph 500 of time vs. engine exhaust gas temperature, with an identification of the initiation of NOx reduction based on the generation and supply of ammonia to the exhaust line 216, and the initiation of NOx reduction based on the supply of urea through urea injector 210. Line 502 represents the engine exhaust gas temperature immediately upstream and adjacent to the SCR catalyst 219 inlet, and line 504 represents the engine exhaust gas temperature immediately upstream and adjacent to the SCR catalyst 204 inlet. After starting the engine, the heating system 302, 302' will eventually generate ammonia, which is then supplied to exhaust line 216. At approximately 75 degrees Celsius the ammonia and SCR catalyst 219 can start converting the NOx to $H_2O$ and $N_2$. This initiation of the conversion of NOx based on the ammonia is identified at point 506 on the graph, but ammonia can be injected at the same time the engine is started in order to pre-saturate the SCR for improved NOx conversion. This ammonia supply and NOx conversion/reduction continues for the cold start or low load condition of the engine, i.e., until the engine exhaust gas reaches approximately 250 degrees Celsius at the SCR catalyst 204 (point 408 on the graph). At approximately this time, the supply of ammonia to exhaust line 216 is discontinued or reduced. Also at approximately this time, controller 314 may initiate the supply of urea to urea injector 210, which is continued through the operation of the engine. Alternatively, the supply of urea may be initiated before the exhaust gas reaches 250 degrees Celsius at urea injector 210, such as at 200 degrees Celsius, but may not be the full supply. As noted above, however, depending on the exhaust and urea flow rate, full conversion of the injected urea may not take place until the engine exhaust gas reaches approximately 250 degrees Celsius.

Thus, as shown in the graph of FIG. 3, the ammonia supply to the engine exhaust line 216 may allow for NOx reduction during cold start and low load conditions, approximately 250 seconds before the NOx reduction based on the injection of urea for standard aftertreatment configurations. Further, the upstream location of the supply of ammonia and associated SCR catalyst 219 may take advantage of higher exhaust temperatures than the urea injector 210 location, providing for greater NOx removal.

Controller 314 may be used to control the systems disclosed here. For example, controller may monitor the temperature of the exhaust gas via temperature sensor 322 and control the generation and supply of ammonia to exhaust line 216, and control supply of urea through urea injector 210. While certain temperatures and conditions are stated above, this disclosure includes variations from these conditions. For example, supplying ammonia during cold start or low load conditions does not require supply during the entire cold start or low load condition, and the temperatures triggering generation and supply of ammonia, and supply of urea, may be modified and based on any predetermined temperatures, or other conditions. Further, controller 314 may use standard models known in the art to meter the appropriate amount of ammonia and urea based on, for example, the exhaust gas temperature and NOx content in the exhaust gas. Controller 314 may also control the supplying and releasing of ammonia to/from the ammonia absorber 318. For example, controller 314 may continue the heating of the urea in urea tank 212 even when urea is being supplied to the exhaust line 216 via urea injector 210. The ammonia produced may be stored on ammonia absorber 318 for later use when urea injection is no longer appropriate.

In addition to controlling various aspect of the ammonia generation, ammonia supply, and urea supply, controller 314 may also include appropriate sensors and software to monitor the concentration of urea in urea tank 212 as it is affected by the generation of ammonia. For example, controller 314 may track the concentration of urea and ammonia in the urea and water mixture of urea tank 212, via a temperature sensor and standard modeling to provide notifications or adjust operating conditions of the engine system 100 when the urea mixture concentration is no longer within the appropriate range, or to keep the urea mixture concentration within the appropriate range.

It should be appreciated that the above described method is merely exemplary. In some embodiments, the method may include a number of additional or alternative steps, and in some embodiments, one or more of the described steps may be omitted.

It will be apparent to those skilled in the art that various modifications and variations can be made to the drive system of the present disclosure. Other embodiments of the performance monitor will be apparent to those skilled in the art from consideration of the specification and practice of the engine aftertreatment system disclosed herein. It is intended that the specification and examples be considered as exemplary only, with a true scope of the invention being indicated by the following claims and their equivalents.

What is claimed is:

1. A method for treating engine exhaust gas of an engine system, comprising:
generating ammonia within a urea tank using heat from an air intake system and urea within the urea tank;
supplying the generated ammonia to an engine exhaust system upstream of a catalyst device; and
supplying urea to the engine exhaust gas downstream of the supplying of the ammonia, and downstream of the catalyst device.

2. The method of claim 1, wherein the supplying of ammonia takes place during cold start conditions of the engine system.

3. The method of claim 2, wherein the catalyst device is a first catalyst device and the engine system includes a second catalyst device, and the supplying of urea takes place upstream of the second catalyst device.

4. The method of claim 2, wherein the supplying of ammonia is discontinued when the engine system is no longer operating in cold start conditions.

5. The method of claim 4, wherein the supplying of urea overlaps with the supplying of ammonia to the engine exhaust system.

6. The method of claim 1, wherein the generating of ammonia includes supplying heat generated by compressing air from the air intake system to the urea supply.

7. The method of claim 1, wherein the supplying of urea to engine exhaust gas is from the urea tank.

8. The method of claim 7, wherein the generation of ammonia in the urea tank is monitored to track a urea concentration in the urea tank.

9. The method of claim 1, wherein the engine system includes a turbocharger, and the supplying of ammonia to the engine exhaust system is directly downstream of a turbine of the turbocharger.

10. The method of claim 1, further including controlling the supply of ammonia to the engine exhaust system.

11. A method for treating engine exhaust gas of an engine system, comprising:
generating ammonia from a urea supply;
supplying the ammonia to the engine exhaust gas during a cold start condition of the engine system, and at a location upstream or directly downstream of a turbine of a turbocharger of the engine system;

discontinuing the supply of ammonia at a predetermined temperature; and supplying urea to the engine exhaust gas.

12. The method of claim 11, wherein the location is upstream of the supplying of the urea to the engine exhaust gas.

13. The method of claim 12, wherein the engine system includes a first and second catalyst device, and the supplying of ammonia takes place upstream of both the first and second catalyst device, and the supplying of urea takes place downstream of the first catalyst device.

14. The method of claim 11, wherein the generating ammonia includes generating ammonia within a urea tank using heat from an air intake system of the engine system.

15. The method of claim 13, wherein the engine system includes a urea tank, and the generating of ammonia takes place in the urea tank, and the supplying of urea to engine exhaust gas is from the urea tank.

16. The method of claim 13, wherein the engine system includes a turbocharger, and the supplying of ammonia to the engine exhaust gas is downstream of a turbine of the turbocharger.

17. An engine system, comprising:

an engine intake system, an engine, and an engine exhaust system;

a system for generating ammonia within a urea tank including a heater to heat urea within the urea tank;

an ammonia line coupled to the engine exhaust system;

a urea line coupled to the engine exhaust system downstream of the ammonia line; and a catalyst located in the engine exhaust system upstream of the urea line.

18. The engine system of claim 17, wherein the catalyst is a first catalyst, and the engine system includes a second catalyst, and the urea line is located upstream of the second catalyst.

19. The engine system of claim 18, wherein the system for generating ammonia is at least partially located in the urea tank, and the urea line is coupled to the urea tank.

20. The engine system of claim 17, wherein the urea tank is a first urea tank and the engine system includes a second urea tank, the heater is provided in the first urea tank, and the urea line is coupled to the second urea tank.

* * * * *